United States Patent
Lin et al.

(10) Patent No.: US 12,431,624 B2
(45) Date of Patent: Sep. 30, 2025

(54) ANTENNA EQUIPMENT

(71) Applicants: Tyco Electronics Holdings (Bermuda) No. 7 Limited, Hamilton (BM); Tyco Electronics Japan G.K., Kawasaki (JP)

(72) Inventors: Yu Ching (Jimmy) Lin, Taipei (CN); Sin-Hooi Cheah, Taipei (CN); Hiroaki Kikuchi, Kawawaki (JP); Kuei Hsu Hsiang, Taipei (CN)

(73) Assignees: Tyco Electronics Japan G.K., Kawasaki (JP); Tyco Electronics Holdings (Bermuda) No. 7 Limited, Hamilton (BM)

( * ) Notice: Subject to any disclaimer, the term of this patent is extended or adjusted under 35 U.S.C. 154(b) by 109 days.

(21) Appl. No.: 17/888,953

(22) Filed: Aug. 16, 2022

(65) Prior Publication Data

US 2023/0053514 A1    Feb. 23, 2023

(30) Foreign Application Priority Data

Aug. 17, 2021 (CN) .......................... 202110941986.2

(51) Int. Cl.
*H01Q 9/04* (2006.01)
*H01Q 5/45* (2015.01)
*H01Q 9/40* (2006.01)

(52) U.S. Cl.
CPC ............. *H01Q 5/45* (2015.01); *H01Q 9/0421* (2013.01); *H01Q 9/40* (2013.01)

(58) Field of Classification Search
CPC ...... H01Q 5/307; H01Q 5/378; H01Q 9/0421; H01Q 9/40
See application file for complete search history.

(56) References Cited

U.S. PATENT DOCUMENTS

| | | | |
|---|---|---|---|
| 2002/0000938 A1* | 1/2002 | Hoashi | H01Q 9/0407 343/702 |
| 2004/0137950 A1* | 7/2004 | Bolin | H01Q 5/40 455/562.1 |
| 2007/0109202 A1* | 5/2007 | Vance | H01Q 5/378 343/702 |
| 2007/0285321 A1* | 12/2007 | Chung | H01Q 5/371 343/702 |
| 2008/0252536 A1* | 10/2008 | Anguera | H01Q 1/52 343/702 |
| 2009/0085814 A1* | 4/2009 | Johnson | H01Q 5/378 343/702 |
| 2012/0100817 A1* | 4/2012 | Schachar | H01Q 1/243 343/843 |

OTHER PUBLICATIONS

C. H. See, R. A. Abd-Alhameed, D. Zhou and P. S. Excell, "Dual-Frequency Planar Inverted F-L-Antenna (PIFLA) for WLAN and Short Range Communication Systems," in IEEE Transactions on Antennas and Propagation, vol. 56, No. 10, pp. 3318-3320, Oct. 2008, doi: 10.1109/TAP.2008.929537. (Year: 2008).*

* cited by examiner

*Primary Examiner* — Dameon E Levi
*Assistant Examiner* — Leah Rosenberg
(74) *Attorney, Agent, or Firm* — Barley Snyder

(57) ABSTRACT

An antenna device includes a main circuit board, a first-type antenna ground-coupled to the main circuit board, and a second-type antenna ground-coupled to the main circuit board. The first-type antenna has a ground structure. The second-type antenna is spaced apart from the first-type antenna and an operating bandwidth of the second-type antenna is greater than an operating bandwidth of the first-type antenna.

19 Claims, 1 Drawing Sheet

ANTENNA EQUIPMENT

CROSS-REFERENCE TO RELATED APPLICATIONS

This application claims the benefit of the filing date under 35 U.S.C. § 119 (a)-(d) of Chinese Patent Application No. 202110941986.2, filed on Aug. 17, 2021.

FIELD OF THE INVENTION

The present disclosure relates to the field of communication technology, and in particular to an antenna device.

BACKGROUND

Mobile communication is moving from the connection among people to the connections between people and things and among things. The interconnection of all things is an inevitable trend, however, the current network is insufficient for such connections. In fact, compared with short-range communication technologies such as Bluetooth, ZigBee etc., the mobile cellular network has the characteristics of wide coverage, mobility, and capability of a large number of connections, which can bring more abundant application scenarios and should become the main connection technology of IoT (Internet of Things).

In recent years, with the rapid development of IoT, the communication technology of IoT has also been greatly improved. NB-IoT (Narrow Band Internet of Things) is a prominent one of the latest IoT technologies, which supports the cellular data connection among low-power devices in the wide area network, also known as low power wide area network (LPWAN). NB-IoT supports the efficient connection among devices with long standby time and high network connection requirements. At the same time, it can also provide very comprehensive indoor cellular data connection coverage.

In antenna structure design, the structure design of the products of IoT is quite different from the structure design of mobile terminals. Structure design of the products of IoT is not as mature as that of the mobile terminals in terms of technology, so there is no pre-designed antenna areas in the existing IoT products. The antenna environment is relatively complex and irregular, and the terminal devices have different sizes, thereby greatly increasing the difficulty of antenna design. Under such background, miniaturizing the antenna in the terminal device has become a current technical problem.

Due to the compact structure of the existing small and compact IoT devices, the antennas and circuit boards therein are also miniaturized, so that the low band performance of such small and compact IoT devices is poor. For example, the IoT devices generally need to support LTE, LPWAN, and 5G standards with operating frequencies as low as 600 MHz. For this purpose, the size of the antenna used for the IoT devices is about ½ of its operating wavelength, which is larger than the sizes of most of the IoT devices. However, the existing IoT devices using traditional antenna designs cannot achieve better antenna performance at frequency bandwidths lower than 960 MHz. Therefore, the existing IoT devices can only achieve better antenna performance by increasing their sizes.

SUMMARY

An antenna device includes a main circuit board, a first-type antenna ground-coupled to the main circuit board, and a second-type antenna ground-coupled to the main circuit board. The first-type antenna has a ground structure. The second-type antenna is spaced apart from the first-type antenna and an operating bandwidth of the second-type antenna is greater than an operating bandwidth of the first-type antenna.

BRIEF DESCRIPTION OF THE DRAWINGS

The features, advantages, and other aspects of various embodiments of the present disclosure will become more apparent with reference to the following detailed description and in connection with drawings. Several embodiments of the present disclosure are shown by way of example and not limitation, in the drawings.

DETAILED DESCRIPTION OF THE EMBODIMENTS

Figure 1:
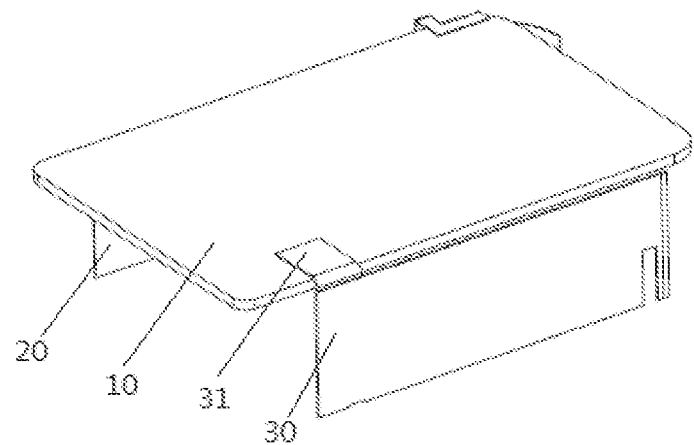
FIG. 1 is a perspective view of an antenna device according to an embodiment.

The technical solution of the present invention will be further specifically described by way of embodiments and with reference to the accompanying drawings. In the specification, the same or similar reference numerals indicate the same or similar parts. The description of the embodiments of the present invention with reference to the accompanying drawings is intended to explain the general inventive concept of the present invention, and should not be construed as a limitation of the present invention.

The terms "comprising", "including", and the like, as used herein, should be understood to mean an open term, that is, "comprising/including, but not limited to", meaning that other items may also be included. The term "based on" is "based at least in part on." The term "one embodiment" means "at least one embodiment"; the term "another embodiment" means "at least one additional embodiment", and the like.

The present invention mainly focuses on the following technical problems: how to extend the low band and its corresponding antenna efficiency of an antenna device for IoT.

To solve the above problems, the present invention discloses an antenna device, which includes: a main circuit board, a first-type antenna and a second-type antenna. Specifically, the first-type antenna is ground-coupled to the main circuit board, the second-type antenna is ground-coupled to the main circuit board, and the second-type antenna is spaced relatively apart from the first-type antenna. The first-type antenna has a ground structure, and the bandwidth of the second-type antenna is greater than that of the first-type antenna.

Figure 2:
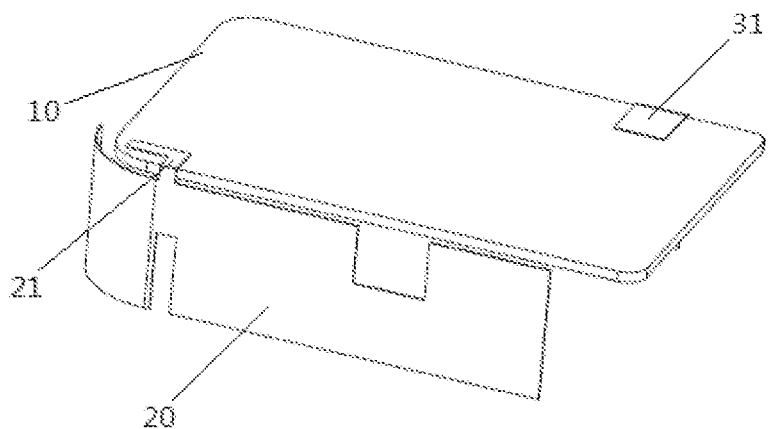
FIG. 2 is another perspective view of the antenna device of FIG. 1.

As shown in FIGS. 1 and 2, the antenna device disclosed in this embodiment includes a main circuit board 10, a first-type antenna 20, and a second-type antenna 30. Specifically, the first-type antenna 20 and the second-type antenna 30 are ground-coupled to the main circuit board 10 in a relatively spaced manner.

In this embodiment, the first-type antenna 20 is ground-coupled to a first side of the main circuit board 10, and the second-type antenna 30 is ground-coupled to a second side of the main circuit board 10 opposite to the first side.

In this embodiment, the main circuit board 10 is configured to control the normal operation of the first-type antenna 20 and the second-type antenna 30.

As shown in FIG. 2, the first-type antenna 20 has a ground structure 21. In practical applications, the first-type antenna 20 is ground-coupled to the first side of the main circuit board 10 via the ground structure 21. In practical applications, the first-type antenna 20 is a Planar Inverted F-type Antenna (hereinafter referred to as a PIFA antenna). In this embodiment, the ground-coupling between the ground structure 21 of the PIFA antenna 20 and a side of the main circuit board 10 can be taken any of the following forms: soldering, conductive glue, a spring contact finger and a spring pin. In an embodiment, the PIFA antenna 20 can control the bandwidth efficiency of 800-900 MHz.

As shown in FIGS. 1 and 2, the second-type antenna 30 is also coupled to the second side of the main circuit board 10 via the corresponding ground member 31. The operating bandwidth of the second-type antenna 30 is greater than that of the first-type antenna 20. In practical applications, the second-type antenna 30 may be a monopole antenna. In this embodiment, the ground-coupling between the monopole antenna 30 and the main circuit board 10 can take any of the following forms: soldering, conductive glue, a spring contact finger and a spring pin. In an embodiment, the monopole antenna 30 can control the bandwidth efficiency of about 700 MHz. Specifically, the disclosed antenna device can achieve improved bandwidth performance of 698 MHz-960 MHz in the low band entirely. It is possible to increase the coverage of the low band without reducing the coverage of the high frequency band of the antenna as compared with the existing antenna device, thereby improving the performance of the antenna device.

In practical design, the size of the antenna device can be designed to be, for example, 50 mm×15 mm×0.2 mm or 65 mm×12 mm×0.2 mm, or the like. That is, the antenna device disclosed in the present invention can realize miniaturization and compactness, and can realize its effective antenna efficiency (for example, the effective antenna efficiency reaches 20% or above).

In addition, the PIFA antenna 20 in the disclosed antenna device may be made of one of a PCB antenna, a flexible printed circuit (FPC) antenna, a laser-direct-structuring (LDS) antenna or a metal stamping antenna. The monopole antenna 30 of the antenna device can be made of one of a PCB antenna, an FPC antenna, an LDS antenna, or a metal stamping antenna.

The antenna device disclosed in the present invention physically provides two types of antennas 20, 30 on both sides of the main circuit board 10 separately, and respectively ground-couples the two antennas 20, 30 to the main circuit board 10 along the same direction. This design enables generation of the desired bandwidth and efficiency without sacrificing the size of the IoT device.

The above mentioned is only an embodiment of the present disclosure and is not intended to limit the present disclosure. To a person skilled in the art, various modifications and changes can be made to the embodiments of the present disclosure. Any modifications, equivalent substitutions, improvements, etc. within the spirit and scope of the embodiments of the present disclosure are intended to be included within the scope of the embodiments of the present disclosure.

While the embodiments of the present disclosure have been described with reference to the several specific embodiments, it is understood that the embodiments of the present disclosure are not limited to the specific embodiments disclosed. The embodiments of the present disclosure are intended to cover various modifications and equivalents included in the spirit and scope of the appended claims. The scope of the appended claims is in accord with the broadest interpretation, thus including all such modifications and equivalent structures and functions.

What is claimed is:

1. An antenna device, comprising:
   a main circuit board;
   a first-type antenna ground-coupled to the main circuit board and directly connected to the main circuit board, the first-type antenna has a ground structure; and
   a second-type antenna ground-coupled to the main circuit board and directly connected to the main circuit board, the second-type antenna has a ground member, the second-type antenna is spaced apart from the first-type antenna and an operating bandwidth of the second-type antenna is greater than an operating bandwidth of the first-type antenna, wherein, excluding the ground structure of the first-type antenna and the ground member of the second-type antenna, the first-type antenna and the second-type antenna extend only vertically downward from, and generally orthogonal to, a planar surface of the circuit board.

2. The antenna device of claim 1, wherein the ground structure of the first-type antenna is ground-coupled to a first side of the main circuit board.

3. The antenna device of claim 2, wherein the second-type antenna is ground-coupled to a second side of the main circuit board opposite the first side.

4. The antenna device of claim 1, wherein the second-type antenna is a monopole antenna.

5. The antenna device of claim 1, wherein a ground-coupling between the first-type antenna and the main circuit board is established by one of: soldering, conductive glue, a spring contact finger, and a spring pin.

6. The antenna device of claim 1, wherein a ground-coupling between the second-type antenna and the main circuit board is established by one of: soldering, conductive glue, a spring contact finger, and a spring pin.

7. The antenna device of claim 1, wherein the first-type antenna has one of the following forms: a PCB antenna, an FPC antenna, an LDS antenna, and a metal stamping antenna.

8. The antenna device of claim 1, wherein the second-type antenna has one of the following forms: a PCB antenna, an FPC antenna, an LDS antenna, and a metal stamping antenna.

9. An antenna device, comprising:
   a main circuit board;
   a first-type antenna ground-coupled to the main circuit board by a ground structure, and directly connected to the main circuit board; and
   a second-type antenna ground-coupled to the main circuit board by a ground member, and directly connected to the main circuit board, the second-type antenna is spaced apart from the first-type antenna and an operating bandwidth of the second-type antenna is greater than an operating bandwidth of the first-type antenna, the ground structure of the first-type antenna and the ground member of the second-type antenna each define a contact arranged on a planar surface of the main circuit board, each contact folded relative to a remainder of the first and second-type antennas and over a respective edge of the circuit board to a planar side of the circuit board opposite the first-type antenna and the second-type antenna.

10. The antenna device of claim 9, wherein the first-type antenna is ground-coupled to a first side of the main circuit board and the second-type antenna is ground-coupled to a second side of the main circuit board opposite the first side.

11. The antenna device of claim 9, wherein the main circuit board controls operation of the first-type antenna and the second-type antenna.

12. The antenna device of claim 9, wherein the second-type antenna is a monopole antenna.

13. The antenna device of claim 9, wherein the first-type antenna controls a bandwidth efficiency of 800-900 MHz and the second-type antenna controls a bandwidth efficiency of 700 MHz.

14. The antenna device of claim 9, wherein the antenna device has a bandwidth efficiency of 698-960 MHz.

15. The antenna device of claim 9, wherein the antenna device has a size of 50 mm×15 mm×0.2 mm or 65 mm×12 mm×0.2 mm.

16. The antenna device of claim 15, wherein an effective antenna efficiency of the antenna device is greater than or equal to 20%.

17. An antenna device, comprising:
a main circuit board;
a first-type antenna ground-coupled to a first side of the main circuit board and directly connected to the main circuit board, the first-type antenna has a ground structure; and
a second-type antenna ground-coupled to a second side of the main circuit board opposite the first side with a ground member and directly connected to the main circuit board, the second-type antenna is spaced apart from the first-type antenna and an operating bandwidth of the second-type antenna is greater than an operating bandwidth of the first-type antenna, the ground structure of the first-type antenna and the ground member of the second-type antenna each define a contact arranged on a planar surface of the main circuit board, each contact folded relative to a remainder of the first and second-type antennas and over a respective edge of the circuit board to a planar side of the circuit board opposite the first-type antenna and the second-type antenna.

18. The antenna device of claim 17, wherein the ground structure of the first-type antenna is ground-coupled to the first side of the main circuit board proximate a first end of the main circuit board in a longitudinal direction of the main circuit board.

19. The antenna device of claim 18, wherein the ground member of the second-type antenna is ground-coupled to the second side of the main circuit board proximate a second end of the main circuit board opposite the first end in the longitudinal direction.

* * * * *